United States Patent [19]

Hellewell

[11] Patent Number: 4,605,281
[45] Date of Patent: Aug. 12, 1986

[54] SELF-ALIGNING FIBER OPTIC CONNECTOR

[76] Inventor: Byron A. Hellewell, 1074 W. 1290 South, Syracuse, Utah 84041

[21] Appl. No.: 571,627

[22] Filed: Jan. 17, 1984

[51] Int. Cl.⁴ .................................................. G02B 6/38
[52] U.S. Cl. .................................. 350/96.21; 350/96.20
[58] Field of Search ................ 350/96.20, 96.21, 96.22

[56] References Cited

U.S. PATENT DOCUMENTS

| 3,806,225 | 4/1974 | Codrino | 350/96 B |
| 3,948,582 | 4/1976 | Martin | 350/96 C |
| 4,043,026 | 8/1977 | Weidhaas et al. | 350/96.21 X |
| 4,101,198 | 7/1978 | Heldt | 350/96.20 |
| 4,185,883 | 1/1980 | Chown et al. | 350/96.20 |
| 4,192,575 | 3/1980 | Hodge | 350/96.21 |
| 4,240,695 | 12/1980 | Evans | 350/96.21 |
| 4,245,887 | 1/1981 | Johnson | 350/96.21 |
| 4,330,171 | 5/1982 | Malsot et al. | 350/96.21 |

FOREIGN PATENT DOCUMENTS

| 52-8835 | 1/1977 | Japan | 350/96.21 |
| 2086602 | 5/1982 | United Kingdom | 350/96.21 |

Primary Examiner—William L. Sikes
Assistant Examiner—Frank González
Attorney, Agent, or Firm—Donald J. Singer; Bobby D. Scearce

[57] ABSTRACT

A novel self-aligning optical fiber connector is described which comprises a body member having an axial bore for receiving a lengthwise portion of the light-conducting core of a fiber optic cable, a pair of alignment projections and a pair of alignment slots disposed on one end of the body member in quadrature around the central bore and a clamp or other retainer near the other end of the body member to connect the cable sheath to the connector body. A connector assembly comprising two mating connector body members may be used to coaxially join a pair of abutting fiber optic cores.

2 Claims, 5 Drawing Figures

SELF-ALIGNING FIBER OPTIC CONNECTOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical fiber coupling devices, and more particularly to a novel optical fiber connector for coupling two light-conducting optical fibers in an abutting relationship.

The efficient operation of systems utilizing optical fibers requires that the light-conducting fibers through which the optical signal transmissions are made are characterized by minimal losses in optical transmissibility along the optical path length of the optical fiber cable system. Where the ends of two optical fibers need to be joined in an abutting relationship in order to provide a continuous optical path through the two abutting fibers, special precautions must be taken in providing accurate alignment of the abutting ends in order to prevent loss of light at the juncture, or otherwise to avoid impairment of the optical transmission characteristics of the optical fiber cable system.

Numerous optical fiber connector configurations have been proposed for coaxially joining the abutting end portions of two cooperating optical fibers to preserve the light-conducting property of the two fibers at and through the juncture. However, as a general proposition, these existing optical fiber connector configurations may be characterized by complicated construction design and high cost of fabrication, and may in use fail to provide uniformly precise alignment of the abutting fiber ends.

The present invention provides a novel optical fiber connector wherein the precise butt joining of the ends of two cooperating optical fibers is successfully accomplished. The connector of the present invention is inexpensive and reliable, and is characterized by simplicity of configuration and function, and lends itself easily to manufacture using conventional processes. The connector of the present invention provides the additional advantage in that a pair of mating connectors utilized to hold two optical fibers in an abutting relationship are substantially identical, which may substantially reduce the cost and complexity of equipment incorporating fiber optic light transmission means.

It is, therefore, a principal object of the present invention to provide an improved optical fiber connector for joining two optical fibers in an abutting relationship.

It is a further object of the present invention to provide an optical fiber connector which is self-aligning.

It is yet another object of the invention to provide a self-aligning optical fiber connector wherein the abutting ends of the optical fibers are held in precise mating relationship under mild axial compression on the abutting optical fibers.

These and other objects of the present invention will become apparent as the detailed description of certain representative embodiments thereof proceeds.

SUMMARY OF THE INVENTION

In accordance with the foregoing principles and objects of the present invention, a novel self-aligning optical fiber connector is described which comprises a body member having an axial bore for receiving a lengthwise portion of the light-conducting core of a fiber optic cable, a pair of alignment projections and a pair of alignment slots disposed on one end of the body member in quadrature around the central bore and a clamp or other retainer near the other end of the body member to connect the cable sheath to the connector body. A connector assembly comprising two mating connector body members may be used to coaxially join a pair of abutting fiber optic cores.

DESCRIPTION OF THE DRAWINGS

The present invention will be more clearly understood from the following description of certain representative embodiments thereof read in conjunction with the accompanying drawings wherein:

FIG. 1b is a side elevational view of a mating connector for that depicted in FIG. 1a, and which shows an edge view of the representative alignment projections depicted in FIG. 1a.

DETAILED DESCRIPTION

Figure 1A:
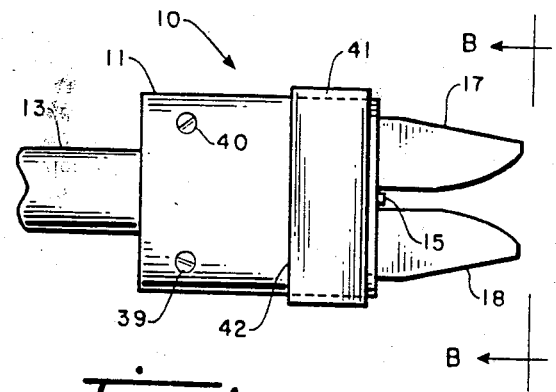
FIG. 1a is a side elevational view of an optical fiber connector of the present invention showing representative alignment projections of the connector.
Figure 1B:
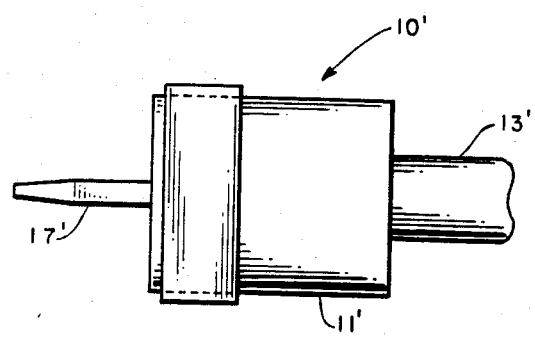

Referring now to the drawings, FIG. 1a presents a side elevational view of a representative embodiment of the connector 10 of the present invention. FIG. 1b shows a side elevational view of a mating connector 10' for that depicted in FIG. 1a. As will become apparent upon further reading hereof, connector 10 of FIG. 1a is substantially identical to connector 10' of FIG. 1b, and the view of connector 10' may therefore be considered as a mirror image of connector 10 rotated 90° in the plane of FIG. 1b. Referring now to FIG. 1a, connector 10 of the present invention comprises a connector body member 11 for supporting a fiber optic cable 13 having a concentric optical fiber core 15. Connector body member 11 supports on one endface thereof a pair of alignment fingers or projections 17,18 and defines a pair of alignment holes or slots 19,20 for mating with the alignment projections of a mating connector. The alignment projections 17,18 and slots 19,20 of connector 10 are disposed in quadrature in connector body member 11 around centrally located optical fiber core 15 substantially as shown in the end view of connector 10 presented in FIG. 2.

Figure 2:
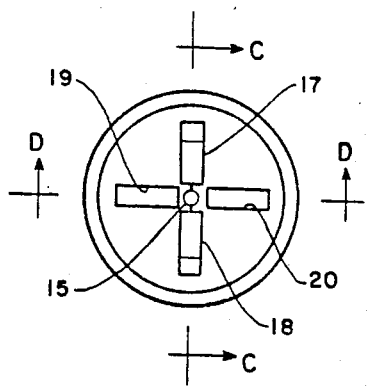
FIG. 2 is a view of the connector of FIG. 1a taken along lines B—B.
Figure 3A:
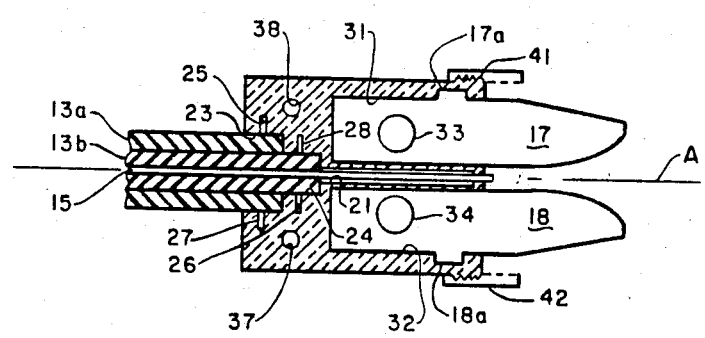
FIG. 3a is an axial sectional view of the connector of FIG. 2 taken along lines C—C.

Referring now to FIG. 3a shown therein is an axial sectional view of the connector 10 of FIG. 2 taken along lines C—C. As shown therein body member 11 may include a central axial hole 21 along central axis A for receiving the optical fiber core 15 of cable 13. On one endface of body member 11 one or more concentric bores 23,24 may be provided for snugly receiving, respectively, the outer and inner sheaths of cable 13 shown as outer sheath 13a and inner sheath 13b. In a nonlimiting representative embodiment of the invention, annular slots 25 and 26 may be provided around, respectively, bores 23 and 24 for receiving retaining rings 27 and 28, substantially as shown, in order to provide means for connecting the sheaths of cable 13 to connector body member 11 to clamp cable 13 firmly to connector 10. Rings 27,28 may be of conventional type for gripping the sheaths of cable 13 in place as illustrated in FIGS. 3a and 3b.

In the fabrication of a connector 10, it may be desirable to machine, or otherwise form by conventional processes, a unitary device in which the of alignment projections 17,18 are formed integrally with the body 11, and in which the alignment slots 19,20 and the end bores 23,24 are machined into a single cylindrically shaped piece of material comprising body member 11. It is noted, however, that connector 10 is characterized by 180° rotational symmetry about axis A. Therefore, connector 10 may conveniently be fabricated of two identical cylindrical halves, and comprising all the elements as described above in reference to FIG. 3a, the two halves joined along the plane represented by C—C to provide an assembly of connector 10 as shown in the end view of FIG. 2. Assembly of the two identical halves may then be facilitated by providing a pair of holes 37 and 38 through each cylindrical half, such as suggested in FIG. 3a, for receiving the pair of assembly screws 39 and 40 shown in FIG. 1a. Accordingly, a pair of radial slots 31 and 32 of suitable shape may be provided as shown in order to receive separately fabricated alignment projections. Alignment posts 33 and 34 may be provided in slots 31 and 32 as shown in order to be received by mating holes in alignment projections 17 and 18 to ensure proper placement of projections 17,18 within body member 11 as fabricated. Slots 31,32 may be optionally configured to receive tongues 17a,18a substantially as shown to further ensure proper alignment of projections 17,18 within connector body member 11.

Figure 3B:
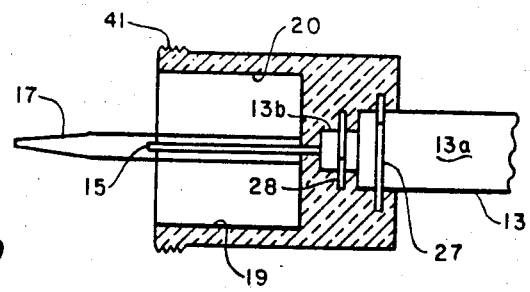
FIG. 3b is an axial sectional view of the connector of FIG. 2 taken along lines D—D.

Referring now to FIG. 3b, which shows a view of connector 10 of FIG. 2 taken along lines D—D thereof, alignment slots 19,20, disposed in quadrature to slots 31,32, are sized and configured to snugly receive a pair of alignment projections in a connector assembly for joining two fiber optic cores in an abutting relationship. Accordingly, alignment projections 17,18 may be configured to grip or clamp the inner surfaces defining the mating alignment slots in order to frictionally resist removal upon assembly of two such connectors.

It is further noted that, because of its symmetry, connector 10 may also be fabricated of two identical halves separated by lines D—D as suggested in FIG. 2, in which case it might be desirable to form the alignment projections integrally with each cylindrical half; assembly of connector 10 using assembly screws in manner similar to that described above may then be accomplished.

A portion of the outer cylindrical surface of body member 11 near alignment projections 17,18 may be provided with threads 41 as suggested in the drawings in order to receive a threaded coupling ring 42 in the assembly of two mating connectors 10,10' as hereinafter described.

In the utilization of a connector 10 to join the ends of two abutting fiber optic cables 13, the outer sheath 13a, and inner sheath 13b (if any) are stripped to expose a predetermined length of the fiber optic core 15, as shown in FIG. 3a. The ends of the sheaths are secured to body member 11 using means such as described above. Sufficient length of the fiber optic core 15 is exposed in order to allow a portion thereof of length approximating the core 15 diameter to project from the endface of body member 11 between the alignment projections 17,18, as suggested in FIG. 3a. Axial hole 21 through which core 15 is received has a diameter of about 1.5 core 15 diameters in order to allow some lengthwise flexing of core 15 within axial hole 21. Axial hole 21 may be defined by a bore of about the core 15 diameter for a short lengthwise portion thereof near the exposed end of core 15 in order to hold core 15 in precise axial alignment for abutting the end of a fiber core held in a mating connector 10'.

In order to join in a precise abutting relationship, the ends of the light-conducting cores of a pair of fiber optic cables for transmission of light across the abutting ends, a second connector 10' is assembled in manner as just described for connector 10, and supporting a mating fiber optic cable 13'. Connector 10' is then oriented so that its alignment projections 17',18' may be inserted into slots 19,20 of connector 10, and, at the same time, alignment projections 17,18 are inserted into slots 19',20' of connector 10' (shown as hidden by broken lines in FIG. 1b). Assuming the exposed ends of the fiber optic cores of cables 13,13' are cleaved square prior to installation into body members 11,11', the abutting ends of the two fiber optic cores will meet squarely just before the two connectors 10,10' are fully mated. The construction of the connector 10 of the present invention ensures that in the assembly of two mating connectors, precise coaxial alignment of the two fiber cores is automatically accomplished. As connectors 10,10' are fully mated, the fibers cores are compressed slightly, and flex lengthwise somewhat as discussed above, while maintaining the ends precisely aligned and flush at the abutting juncture of the cores. The lengthwise flexing of the cores imparts a mild compressive force on the cores at the abutting juncture to maintain proper contact of the ends while the connectors 10,10' are fully mated. When the connectors 10,10' are separated, the cores 15 return to the straight configuration as suggested in FIG. 3a.

The novel fiber optic connector of the present invention may be fabricated of any suitable material as is customary in the fabrication of fiber optic devices, including, but not necessarily limited to glass, metal, plastics, and the like. Because of its symmetry and simplicity of configuration, connector 10 may lend itself easily to the usual fabrication techniques, including machining, injection molding, and the like, or a combination of conventional fabrication techniques, the same not being a limitation on the scope of the present invention. Further, it is envisioned that the connector of the present invention may be configured to accommodate the butt joining of more than one set of fiber cores, and may be varied in size to accommodate any cable or fiber core size.

The present invention, as hereinabove described, therefore provides a novel self-aligning optical fiber connector which is characterized by precise alignment of abutting ends of two optical fibers under mild compression to preclude any distortions or interference with transmission through the fibers. One notable advantage of the invention over existing devices resides in the feature that each connector may be constructed identically (for a given cable size) which substantially alleviates certain equipment component mating problems.

It is understood that certain modifications to the invention as described may be made, as might occur to one with skill in the field of the invention, within the scope of the appended claims. Therefore, all embodiments contemplated hereunder have not been shown in complete detail. Other embodiments may be developed without departing from the spirit of the invention or from the scope of the appended claims.

I claim:

1. A connector for a fiber optic cable having a light-conducting core and a sheath surrounding said core, comprising:
   (a) a substantially cylindrical body member having first and second endfaces and a coaxial central bore therethrough sized for receiving a corresponding lengthwise portion of said core from which said sheath has been removed;
   (b) means for attaching said sheath to said body member near said first endface;
   (c) a pair of substantially identical alignment projections disposed on said second endface in diametrically opposed relationship to said central bore;
   (d) a pair of substantially identical fully enclosed alignment slots defined in said second endface, and disposed in diametrically opposed relationship to said central bore and in quadrature to said alignment projections, said fully enclosed slots defined in size and shape to receive projections substantially identical to that defining said alignment projections;
   (e) wherein the combination of said body member, alignment projections and slots define a geometric shape having 180° rotational symmetry about the cylindrical axis of symmetry of said body member;
   (f) wherein said body member is formed of two substantially identical half-cylindrical sections joinable along a plane including said axis, each section having corresponding first and second endfaces, said second endface of each section including one alignment slot defined therein, and further comprising means for joining said half-cylindrical sections along said plane; and,
   (g) wherein each alignment projection extends backwards within each half-cylindrical body member section and includes mating holes and mating posts for secure and accurate positioning in relation to each half-cylindrical section.

2. A connector assembly for butt joining the ends of the light-conducting cores of two sheathed fiber optic cables, comprising:
   (a) a pair of substantially identical, substantially cylindrical body members, each body member having first and second endfaces and a coaxial central bore therethrough sized for receiving a corresponding lengthwise portion of one light-conducting core from which said sheath has been removed, and including means near each first endface for attaching one said cable thereto;
   (b) means for joining said body members together in an abutting relationship along respective second endfaces and in coaxial alignment of said central bores, said means including a pair of substantially identical alignment projections disposed on respective second endfaces of each body member and in diametrically opposed relationship to each central bore, and a pair of substantially identical fully enclosed alignment slots defined in the respective second endfaces of each body member and disposed in diametrically opposed relationship to each central bore and in quadrature to said alignment projections, each fully enclosed slot of each body member configured to receive a corresponding projection of the other body member;
   (c) wherein each combination of each body member, alignment projections and slots defines a geometric shape having 180° rotational symmetry about the axis of each body member;
   (d) wherein each body member is formed of two substantially identical half-cylindrical sections joinable along a plane including said cylindrical axis, each section having corresponding first and second endfaces, each second endface of each section including one alignment slot defined therein, and further comprising means for joining said half-cylindrical sections along said planes; and,
   (e) wherein each alignment projection extends backwards within each half-cylindrical body member section and includes mating holes and mating posts for secure and accurate positioning in relation to each half-cylindrical section.

* * * * *